US012287158B2

(12) United States Patent
Endo et al.

(10) Patent No.: US 12,287,158 B2
(45) Date of Patent: Apr. 29, 2025

(54) HEAT EXCHANGER AND METHOD FOR MANUFACTURING SAME

(71) Applicant: HONDA MOTOR CO., LTD., Tokyo (JP)

(72) Inventors: Tsuneo Endo, Saitama (JP); Yuta Kurosawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 273 days.

(21) Appl. No.: 18/128,761

(22) Filed: Mar. 30, 2023

(65) Prior Publication Data

US 2023/0314084 A1    Oct. 5, 2023

(30) Foreign Application Priority Data

Mar. 31, 2022  (JP) .................................. 2022-061345
Oct. 28, 2022  (JP) .................................. 2022-173688

(51) Int. Cl.
*F28D 7/10*    (2006.01)
*B23P 15/26*   (2006.01)

(52) U.S. Cl.
CPC ............... *F28D 7/10* (2013.01); *B23P 15/26* (2013.01)

(58) Field of Classification Search
CPC .................................... F28F 4/10; B23P 15/26
USPC ........................................................ 165/157
See application file for complete search history.

(56) References Cited

U.S. PATENT DOCUMENTS

2003/0066638 A1* 4/2003 Qu ......................... F22B 21/00
257/E23.11

FOREIGN PATENT DOCUMENTS

| AU | 2013270937 A1 | * 12/2014 |
| JP | 2004012348 A  | * 1/2004  |
| JP | 2011-252192 A |   12/2011 |
| JP | 2017-150756 A |   8/2017  |

* cited by examiner

*Primary Examiner* — Davis D Hwu
(74) *Attorney, Agent, or Firm* — Paratus Law Group, PLLC

(57) ABSTRACT

A heat exchanger includes a partition wall that separates two fluids having different temperatures. The partition wall includes a side circumferential portion, and a bottom portion configured to close an opening on one side of the side circumferential portion. Fins are formed on an outer surface of the partition wall, and arranged side by side in a circumferential direction around a center of a cylinder of the side circumferential portion. Each of the fins includes a base portion connected to an outer surface of the bottom portion. Plate-shaped members are provided between the base portions of the fins adjacent in the circumferential direction, and fixed to the outer surface of the bottom portion. The partition wall and the plurality of fins are integrally molded of a same material. The plate-shaped members are formed of a different material of higher emissivity or heat resistance than the material of the fins.

6 Claims, 7 Drawing Sheets

HEAT EXCHANGER AND METHOD FOR MANUFACTURING SAME

CROSS-REFERENCE TO RELATED APPLICATIONS

This application is based upon and claims the benefit of priority from Japanese Patent Application No. 2022-061345, filed Mar. 31, 2022, and Japanese Patent Application No. 2022-173688, filed Oct. 28, 2022, the entire contents of which are incorporated herein by reference.

TECHNICAL FIELD

The present disclosure relates to a heat exchanger including a partition wall that has a bottomed tubular container shape and separates two fluids having different temperatures, and a method for manufacturing the same.

BACKGROUND ART

In the related art, heat exchangers using various heat transfer methods are widely used as the devices for transferring heat between two fluids having different temperatures. In a surface type (partition wall type) heat exchanger, two fluids flow in two spaces partitioned by the partition wall, respectively, and heat is exchanged between the two fluids by the heat transfer via the partition wall or the like.

In recent years, in order to allow more people to secure access to affordable, reliable, sustainable and advanced energy, many researches and developments are actively conducted to contribute to the energy efficiency. In order to contribute to the energy efficiency, there is a need for the improvement in the heat exchange efficiency for the heat exchangers, and in order to improve the heat exchange efficiency, a structure including fins provided on the partition wall, a structure including pores in the heat transfer surface of the partition wall, and the like to increase the heat transfer area are employed.

For example, the heat exchanger is known, which includes a heat transfer tube through which the coolant circulates, and fins contacting the heat transfer tube, in which each fin has a fin main body provided with fine grooves on a surface thereof (see JP-A-2017-150756).

In addition, the heat exchanger is known, which is made of aluminum or aluminum alloy, for example, and includes metal fins each having an anodized aluminum coating formed on a surface thereof (see JP-A-2011-252192).

In the heat exchangers described in JP-A-2017-150756 and JP-A-2011-252192, in order to improve the heat exchange efficiency, it is desirable that the fins and the partition walls (the heat transfer tubes) that separate the two fluids having different temperatures are integrally molded. Meanwhile, depending on the shapes of the partition walls and the fins, there may be limitations to the metal materials that can be used for integrally molding the partition walls and the fins, and accordingly, there is a limit to improving the heat exchange efficiency.

SUMMARY

The present disclosure provides a heat exchanger capable of improving heat exchange efficiency even when there is a limitation on the material used for integrally molding the partition walls and the fins, and a method for manufacturing the same.

According to an aspect of the present disclosure, there is provided a heat exchanger including a partition wall that has a bottomed tubular container shape and separates two fluids having different temperatures, in which: the partition wall includes a side circumferential portion in a cylindrical shape, and a bottom portion configured to close an opening on one side of the side circumferential portion; a plurality of fins are formed on an outer surface of the partition wall, and arranged side by side in a circumferential direction around a center of a cylinder of the side circumferential portion; each of the fins includes a base portion connected to an outer surface of the bottom portion; the base portions of the plurality of fins all extend from the outer surface of the bottom portion in a radial direction around the center of the cylinder of the side circumferential portion, and are arranged side by side in the circumferential direction on the outer surface of the bottom portion; plate-shaped members are provided between the base portions of the fins adjacent in the circumferential direction, and fixed to the outer surface of the bottom portion; the partition wall and the plurality of fins are integrally molded of a same material; and the plate-shaped members are formed of a different material of higher emissivity or heat resistance than the material of the fins.

According to another aspect of the present disclosure, there is provided a method for manufacturing a heat exchanger including a partition wall that has a bottomed tubular container shape and separates two fluids having different temperatures, in which: the partition wall includes a side circumferential portion in a cylindrical shape, and a bottom portion configured to close an opening on one side of the side circumferential portion; a plurality of fins are formed on the outer surface of the partition wall and arranged in a circumferential direction around a center of a cylinder of the side circumferential portion; each of the fins includes a base portion connected to an outer surface of the bottom portion; the base portions of the plurality of fins all extend from the outer surface of the bottom portion in a radial direction around the center of the cylinder of the side circumferential portion, and are arranged side by side in the circumferential direction on the outer surface of the bottom portion; plate-shaped members are provided between the base portions of the fins adjacent in the circumferential direction, and fixed to the outer surface of the bottom portion; and the method includes: integrally molding the partition wall and the plurality of fins by additive manufacturing with powder; and forming the plate-shaped members provided between the fins adjacent in the circumferential direction with a different material of higher emissivity or heat resistance than the material of the fins and fixing the plate-shaped members to an outer surface of the bottom portion.

According to still another aspect of the present disclosure, there is provided a heat exchanger including a partition wall that has a bottomed tubular container shape and separates two fluids having different temperatures, in which: the partition wall includes a side circumferential portion in a cylindrical shape, and a bottom portion configured to close an opening on one side of the side circumferential portion; a plurality of fins are formed on an outer surface of the partition wall, and arranged side by side in a circumferential direction around a center of a cylinder of the side circumferential portion; each of the fins includes a base portion connected to an outer surface of the bottom portion; the base portions of the plurality of fins are formed side by side in parallel; plate-shaped members are provided between the base portions of the adjacent fins, and fixed to the outer surface of the bottom portion; the partition wall and the plurality of fins are integrally molded of a same material; and the plate-shaped members are formed of a different material of higher emissivity or heat resistance than the material of the fins.

According to the present disclosure, it is possible to improve the heat exchange efficiency even when there is a limitation on the material used for integrally molding the partition walls and the fins, because it is possible to enhance heat radiation (radiant heat transfer) by the plate-shaped members formed of a material of higher emissivity or heat resistance.

DESCRIPTION OF EMBODIMENTS

Figure 1:
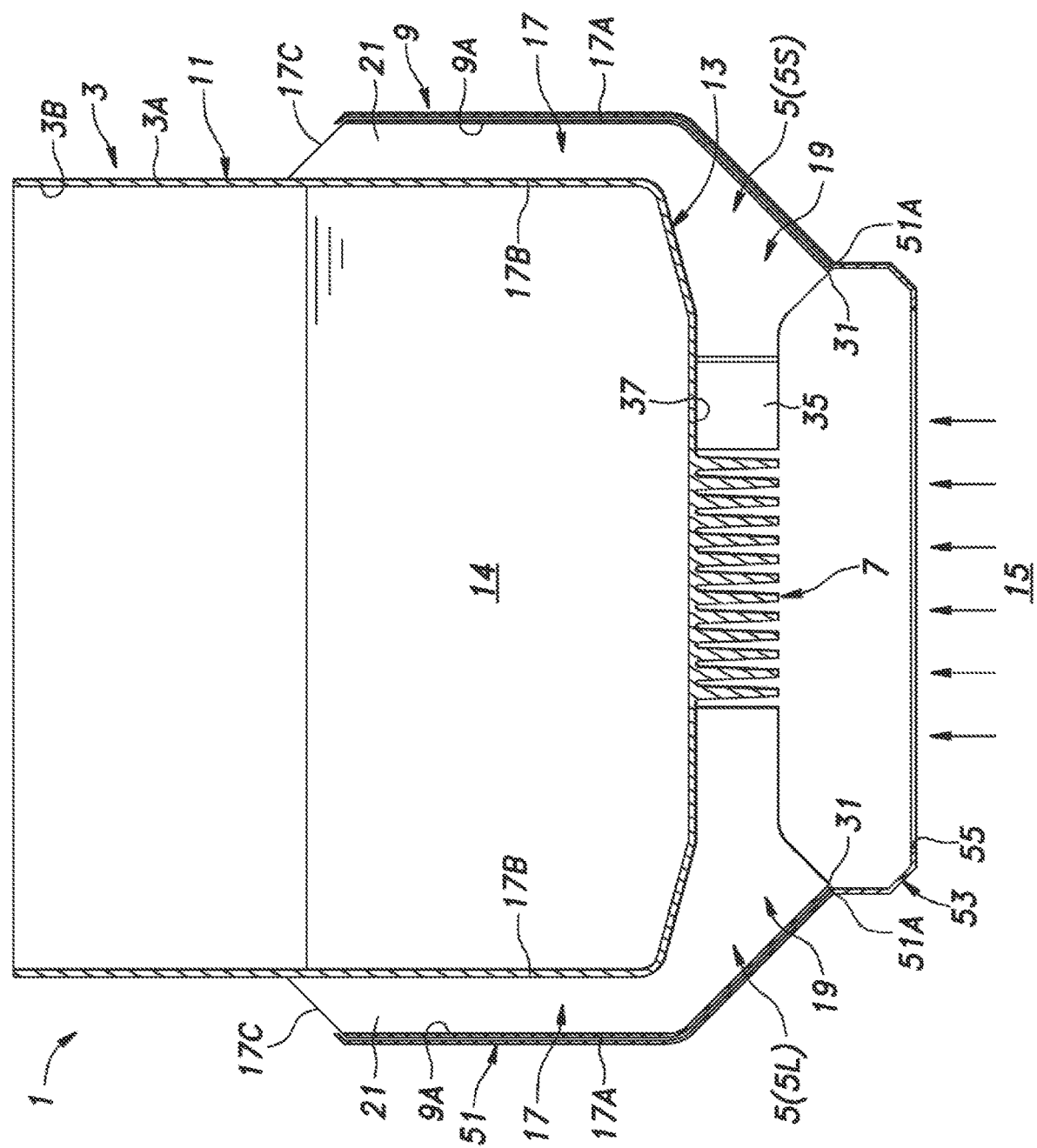
FIG. 1 is a cross-sectional view showing a schematic configuration of a heat exchanger 1 according to an embodiment of the present disclosure.

Hereinafter, a heat exchanger and a method for manufacturing the same according to an embodiment of the present disclosure will be described with reference to the drawings. It is assumed that the drawings are viewed in the direction of the reference numerals.
(Configuration of Heat Exchanger)

As shown in FIG. 1, a heat exchanger 1 mainly includes a partition wall 3, a plurality of plate-shaped fins 5, a plurality of pin-shaped fins 7 in the shape of a pin, and a shell 9. In the heat exchanger 1, two fluids (first and second fluids) of different temperatures, separated by the partition wall 3, indirectly contact each other so that heat is exchanged therebetween.

The partition wall 3 forms a body of the heat exchanger 1 as a bottomed tubular body. The partition wall 3 has a side circumferential portion 11 in a substantially cylindrical shape, and a bottom portion 13 configured to close an opening on one side (on a lower side, in this example) of the side circumferential portion 11. A first fluid 14 which includes a liquid to be heated having a relatively low temperature (for example, water at a room temperature) is injected into the partition wall 3. In addition, a second fluid 15 which includes a gas at a higher temperature than the first fluid (in this example, a high temperature combustion gas from a combustor not shown) flows outside the partition wall 3.

Hereinafter, for the simplicity and clarity of the description, unless otherwise specified, the axial direction, radial direction, and circumferential direction refer to the directions on the basis of a center of the cylinder of the side circumferential portion 11.

The partition wall 3 is an integrally molded article that is integrated with the fins 5 and the pin-shaped fins 7. The partition wall 3, the fins 5, and the pin-shaped fins 7 are made of the same material. The material may be metal, resin, or ceramic. For example, the metal is aluminum.

Figure 2:
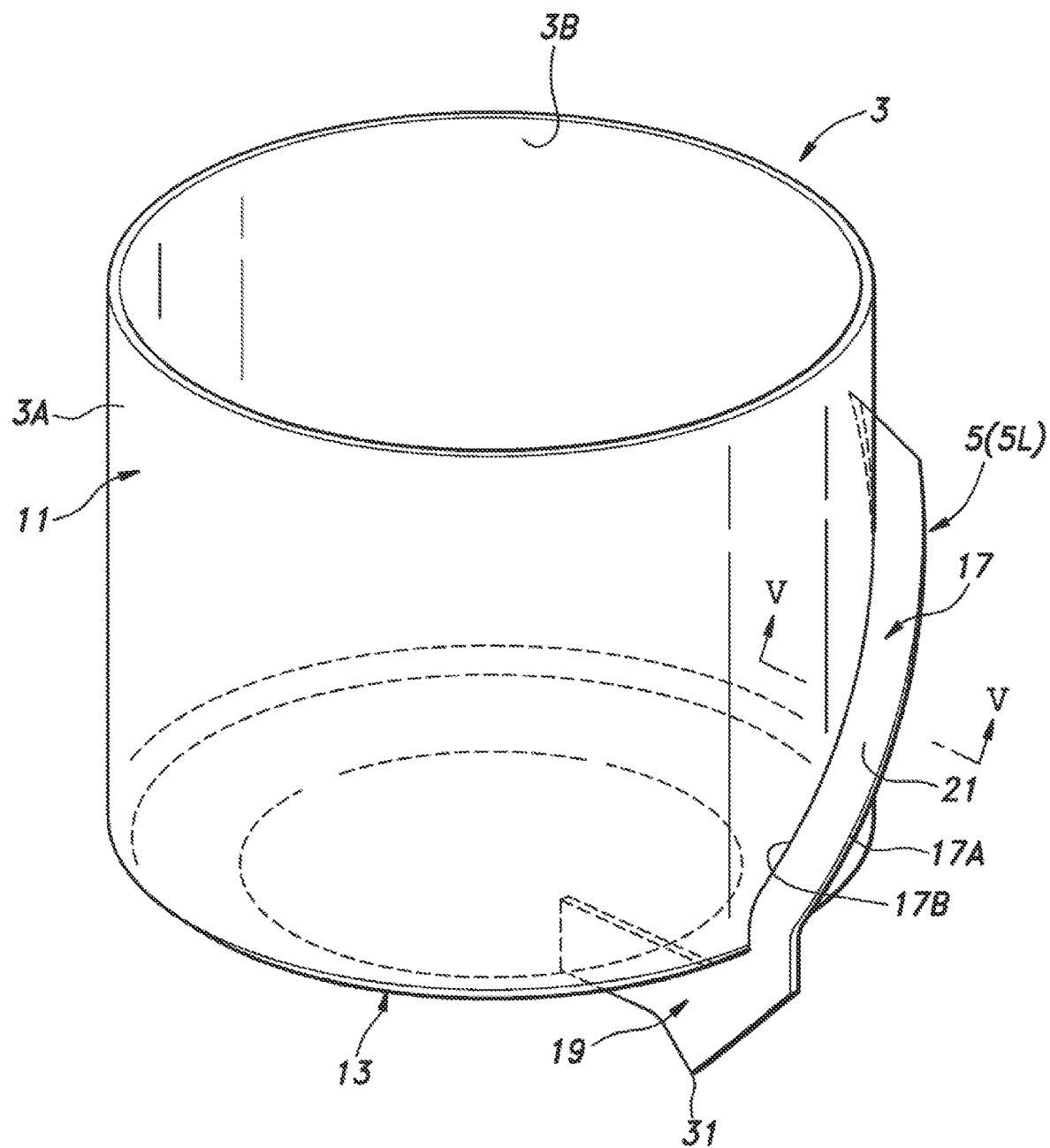
FIG. 2 is a perspective view showing one fin formed on a partition wall of the heat exchanger of FIG. 1.

The plurality of fins 5 are arranged side by side in the circumferential direction on an outer surface 3A of the partition wall 3. Further, as shown in FIG. 2, each fin 5 extends in a longitudinal direction from the side circumferential portion 11 to the bottom portion 13 of the partition wall 3. Each of the fins 5 includes a side portion 17 connected to the outer surface of the side circumferential portion 11 and a base portion 19 connected to the outer surface of the bottom portion 13.

Figure 3:
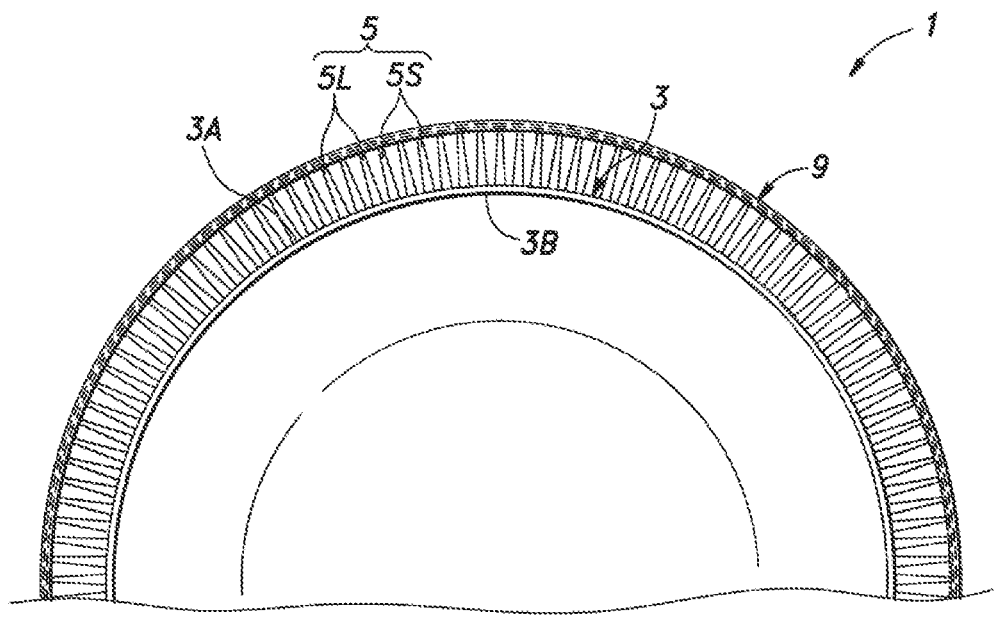
FIG. 3 is a partial top view of the heat exchanger of FIG. 1.

Each fin 5 has a pair of heat transfer surfaces 21, 21 (main heat transfer surfaces) disposed to intersect or perpendicularly to the circumferential direction of the side circumferential portion 11. Further, as shown in FIG. 3, the plurality of fins 5 are arranged so as to be spaced apart from each other in the circumferential direction (namely, in the direction intersecting the pair of heat transfer surfaces 21, 21) over the entire circumference of the side circumferential portion 11.

Figure 4:
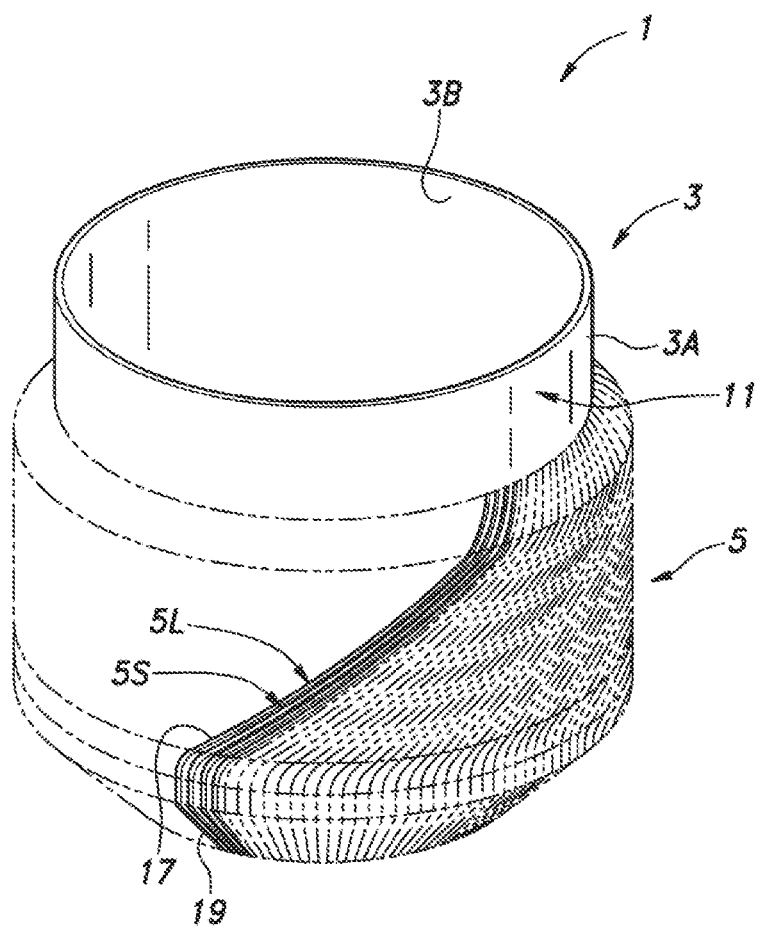
FIG. 4 is a perspective view of the heat exchanger of FIG. 1 with the shell removed.

As shown in FIG. 4, the side portion 17 of each fin 5 configures a helically curved part extending obliquely upward (namely, in the longitudinal direction) from an upper edge of the base portion 19 along the side circumferential portion 11 of the partition wall 3. In this way, by curving at least a part of each fin 5, it is possible to facilitate the flow of the fluid (to increase the flow velocity of the fluid) in the vicinity of the surfaces of the plurality of fins 5.

The width of the side portion 17 of each fin 5 (the distance between an outer edge 17A and an inner edge 17B) is substantially uniform substantially over the entirety of the side portion 17 in the longitudinal direction (see FIG. 1). Meanwhile, an upper edge 17C of the side portion 17 as seen from the side is formed at an acute angle relative to the outer surface 3A of the partition wall 3. Note that the side portion 17 is not particularly limited as long as at least a part of the side portion 17 forms the curved part (namely, the part formed with curved surfaces serving as the heat transfer surfaces). Further, the shape of the curved part is not limited to helical only, and any shape may be used as long as it has the curved surface.

Figure 5:
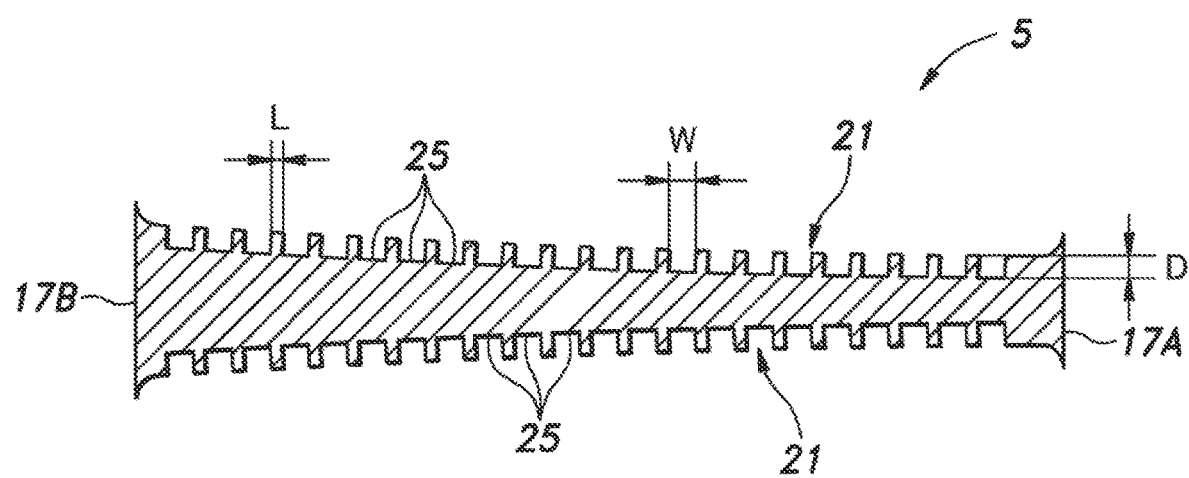
FIG. 5 is a cross-sectional view of the fin of FIG. 1.

As shown in FIG. 5, in a cross section perpendicular to the longitudinal direction (a cross section taken along a line V-V in FIG. 2), the side portion 17 of each fin 5 is formed to taper from the inner edge 17B toward the outer edge 17A. Thus, the space between the adjacent fins 5 (namely, the space between the adjacent heat transfer surfaces 21) increases gradually from the inner side (on the side of the partition wall 3) toward the outer side. As a result, stagnation of the fluid between the adjacent fins 5 can be prevented.

The pair of heat transfer surfaces 21, 21 in the side portion 17 are formed with a plurality of grooves 25 arranged at predetermined intervals from the inner edge 17B to the outer edge 17A. From the viewpoint of improving the heat exchange efficiency, the depth D of the plurality of grooves 25 (the depth in the thickness direction of each fin 5 substantially perpendicular to the heat transfer surfaces 21, 21) may preferably be set to 100 µm to 400 µm. Similarly, the width W of the plurality of grooves 25 may preferably be set to about twice the depth D (200 µm to 800 µm). Further, the interval L between the adjacent grooves 25 may preferably be set to 100 µm to 300 µm. Note that the grooves 25 are not particularly limited as long as the grooves 25 are formed on at least one of the pair of heat transfer surfaces 21.

The base portion 19 of each fin 5 has a substantially straight shape in the longitudinal direction (as seen from the bottom). The base portion 19 extends from a lower edge 17D of the side portion 17 (see FIG. 6) along the bottom portion 13 of the partition wall 3. The base portion 19 as seen from the side is provided with a projection 31 protruding downward into a substantially right angled tip.

Figure 6:
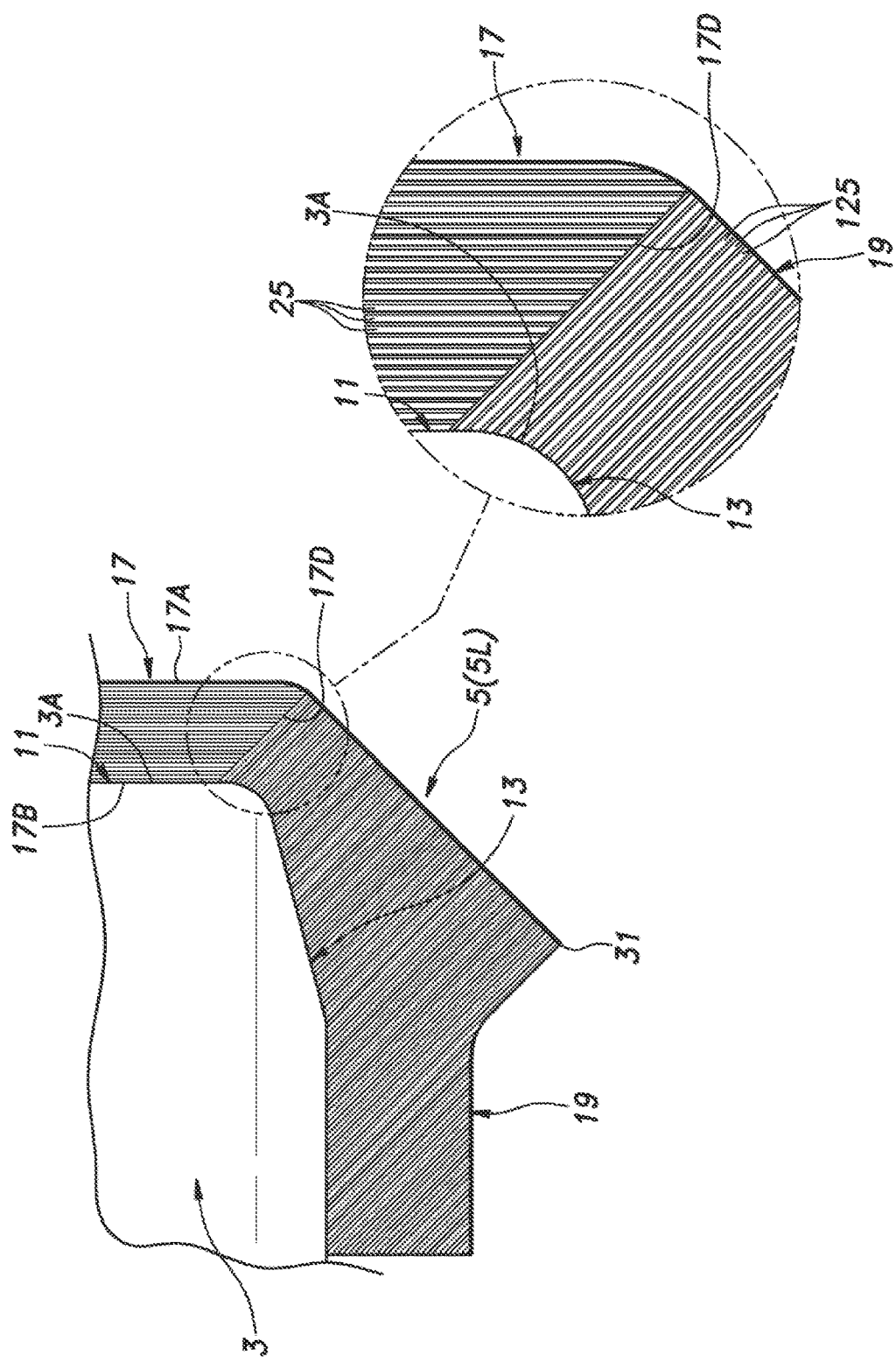
FIG. 6 is an explanatory view showing the detailed structure of a heat transfer surface of the fin of FIG. 1.

Likewise the side portion 17, the pair of heat transfer surfaces 21, 21 of the base portion 19 are also formed with a plurality of grooves 125, but the extension direction of the grooves 125 is different from that of the grooves 25 of the side portion 17. Specifically, as shown in FIG. 6, the grooves 25 in the side portion 17 each extends in the longitudinal direction (in this example, in the substantially vertical direction) along a part of the outer surface 3A in the side circumferential portion 11 of the partition wall 3 (namely, along the side circumferential surface). Meanwhile, the grooves 125 in the base portion 19 each extends toward a part of the outer surface 3A (bottom surface) in the bottom portion 13 of the partition wall 3 (in this example, in a direction inclined to the left, facing upward). The depth, width, and interval of the grooves 125 may be set similarly to those of the grooves 25 in the side portion 17.

As described above, it is possible to guide the second fluid in the vicinity of the bottom surface of the bottomed tubular body to flow toward the bottom surface by means of the plurality of grooves 125, thereby promoting heat transfer at the bottom portion 13 of the bottomed tubular body, and also guide the second fluid in the vicinity of the side circumferential surface of the bottomed tubular body to flow along the side peripheral surface by means of the plurality of grooves 25, thereby promoting the heat transfer at the side circumferential portion 11 of the bottomed tubular body.

Figure 7:
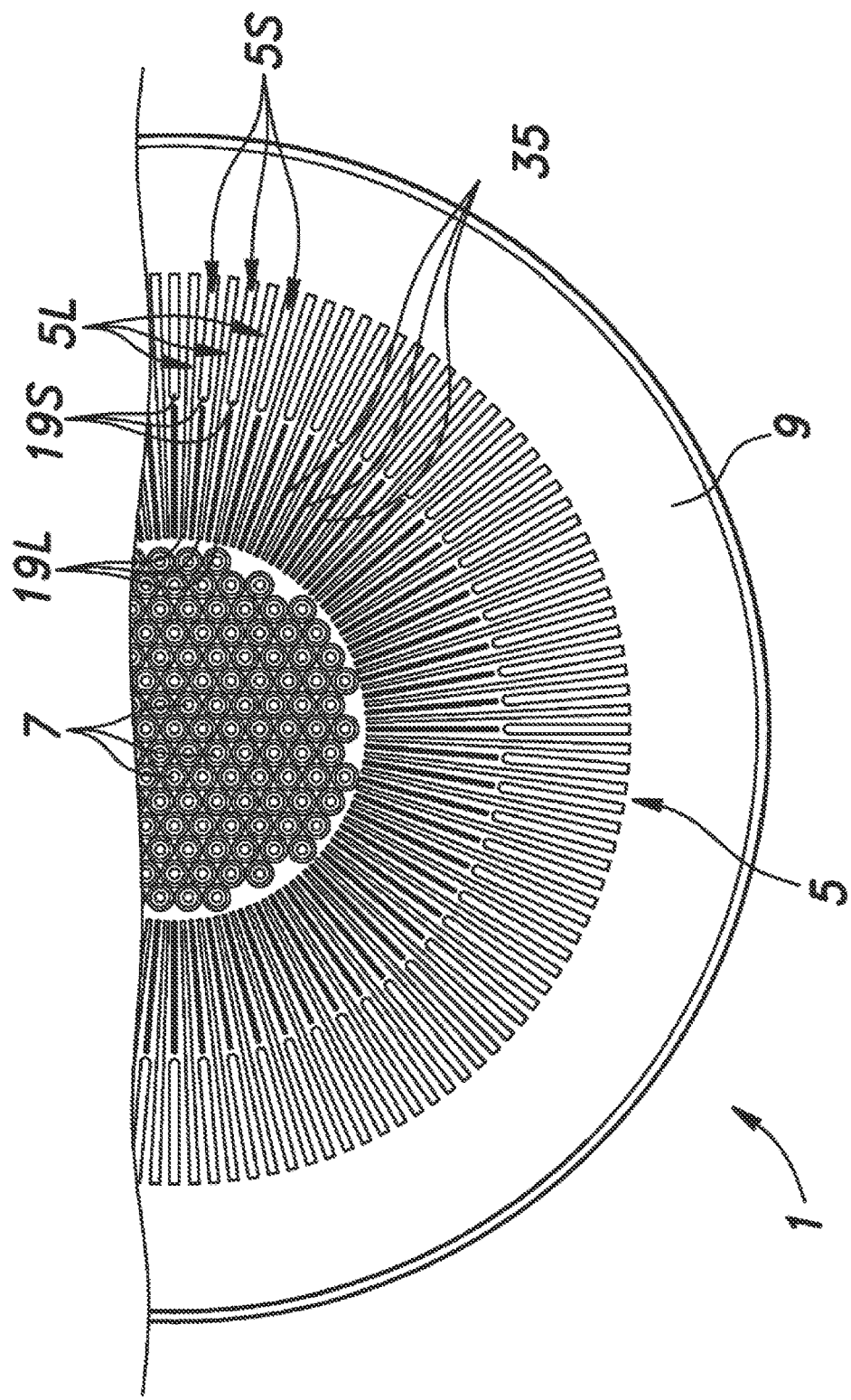
FIG. 7 is a partial bottom view of the heat exchanger of FIG. 1.

As shown in FIGS. 1 and 7, the base portions 19 of the plurality of fins 5 all extend radially on the outer surface of the bottom portion 13 of the partition wall 3. The base portions 19 of the plurality of fins 5 are arranged side by side in the circumferential direction on the outer surface of the bottom portion 13 of the partition wall 3.

The plurality of fins 5 include first fins 5L and second fins 5S having the base portions 19 with different radial lengths. Both the base portion 19L of the first fin 5L and the base portion 19S of the second fin 5S are continuous from the side portion 17 and extend inward in the radial direction from the outer peripheral edge of the bottom portion 13 of the partition wall 3. The radially inner end portion of the base portion 19L of the first fin 5L is positioned further on the inside than the radially inner end portion of the base portion 19S of the second fin 5S in the radial direction. Accordingly, the base portion 19L of the first fin 5L extends further on the inside than the base portion 19S of the second fin 5S in the radial direction.

The first and second fins 5L and 5S are alternately arranged in the circumferential direction.

In the present embodiment, the base portion 19L of the first fin 5L as seen from the bottom has a tapered shape that tapers inward in the radial direction.

Plate-shaped members 35 are provided between the fins 5 adjacent in the circumferential direction on the bottom portion 13 of the partition wall 3 and fixed to the outer surface of the bottom portion 13. Each plate-shaped member 35 has a substantially rectangular plate shape.

Each plate-shaped member 35 is formed of a different material (for example, stainless steel) having a higher emissivity than the material (for example, aluminum) forming the partition walls 3 and the fins 5. A plurality of plate-shaped members 35 are respectively press-fitted into a plurality of mounting grooves 37 formed on the outer surface 3A in the bottom portion 13 of the partition wall 3. In addition to or instead of the fixing by press-fitting, fixing to the outer surface of the bottom portion 13 of the partition wall 3 with a heat-resistant adhesive, fixing by welding, or fixing by caulking are also possible. Note that the material forming the plate-shaped members 35 is not limited to the stainless steel and any material of higher emissivity than at least the material forming the partition wall 3 the fins 5 may be used.

As a result, it is possible to improve the heat exchange efficiency even when there is a limitation on the material used for integrally molding the partition walls 3 and the fins 5, because it is possible to enhance the heat radiation (radiant heat transfer) by the plate-shaped members 35 formed of the material of higher emissivity.

In addition, by fixing the plate-shaped members 35 to the outer surface of the bottom portion 13 of the partition wall 3 with the heat-resistant adhesive or by caulking, it is possible to securely fix the plate-shaped members 35 to the outer surface of the bottom portion 13 of the partition wall 3 even when the material with a melting point significantly different from that of the material forming the partition walls 3 and the fins 5 is used as the material for the plate-shaped members 35.

Each plate-shaped member 35 as seen from the bottom extends between the first fins 5L adjacent in the circumferential direction, is further on the inside than the radially inner end portion of the second fin 5S in the radial direction, and extends in the radial direction along an imaginary straight line extending from the radially inner end portion of the second fin 5S toward the center in the radial direction.

Accordingly, the plate-shaped members 35 are provided in the same number as the second fins 5S.

Each plate-shaped member 35 extends in the radial direction from the radially inner side of the radially inner end portion of the base portion 19S of the second fin 5S to substantially the same position as the radially inner end portion of the base portion 19L of the first fin 5L.

As a result, it is possible to form the plate-shaped members 35 formed of a material of higher emissivity close to the center of the bottom portion 13, thereby improving the heat exchange efficiency of the heat exchanger 1. Further, since the plate-shaped members 35 are arranged so as to prevent an increase in loss that may occur when the second fluid 15 flows from the center radially outward between the fins 5 adjacent in the circumferential direction, the heat exchange efficiency of the heat exchanger 1 is further improved.

It is to be noted that each plate-shaped member 35 is not in contact with the fins 5 (the first fins 5L and the second fins 5S).

As a result, it is possible to transfer the radiant heat from the plate-shaped members 35 to the fins 5 while maintaining heat conduction inside the fins 5. In addition, each plate-shaped member 35 is thinner than the fins 5. Accordingly, the plate-shaped members 35 can allow the fins 5 to receive the heat energy of the gas by heat radiation, while not blocking the passage of the second fluid 15. As a result, the fins 5 can receive a large amount of heat from the gas at a heat transfer rate that is apparently higher than the amount of heat received by heat transfer with the second fluid 15 with which the fins 5 are physically contacted.

It is to be noted that each plate-shaped member 35 is not necessarily formed of a different material of higher emissivity than the material forming the partition walls 3 and the fins 5, and any other material of higher heat resistance than the material forming the partition walls 3 and the fins 5 may be used. This is because, while the portion of the partition wall 3 and the fins 5 does not reach high temperature due to heat transfer to the surrounding low temperature area, the thin plate-shaped member 35 is surrounded by high temperature gas and heat does not escape by heat conduction, and thus the temperature of the thin plate-shaped member 35 reaches a high temperature close to the temperature of the second fluid 15 (to the point of red heat). Since the amount of radiant heat emitted is proportional to the fourth power of temperature (Kelvin temperature), a large amount of radiant heat is emitted at high temperatures even with a somewhat low emissivity. Accordingly, it is necessary that the plate-shaped members 35 have high heat resistance so as not to be melt at high temperatures. It is to be noted that the radiation effect appears clearly when the temperature of the second fluid is high (400° C. to 500° C. or higher).

Further, in the bottom portion 13 of the partition wall 3, the radially inner end portions of the base portions 19L of the plurality of first fins 5L and the radially inner end portions of the plurality of plate-shaped members 35 define a substantially circular region in which the plurality of pin-shaped fins 7 are arranged.

Figure 8:
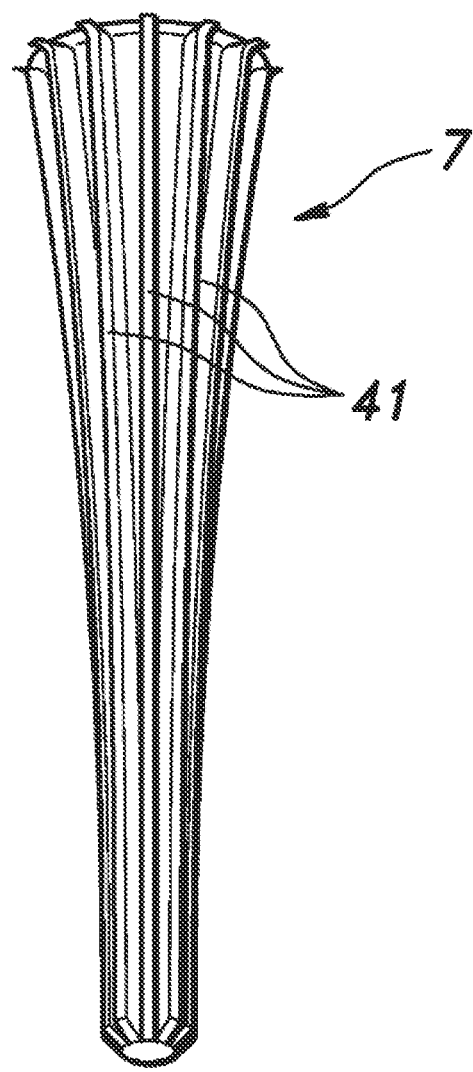
FIG. 8 is a perspective view of a pin-shaped fin of the heat exchanger of FIG. 1.

As shown in FIG. 8, each pin-shaped fin 7 has a tapering cylindrical columnar (or conical) shape. The circumferential surface of each pin-shaped fin 7 is formed with a plurality of ridges 41 extending in the longitudinal direction (protruding direction). The plurality of ridges 41 are disposed at predetermined intervals in the circumferential direction.

Due to the presence of the plurality of ridges 41, the surface area of each pin-shaped fin 7 is increased. Further, since the plurality of ridges 41 are formed on each pin-shaped fin 7 having a tapering shape, an effect of reducing the thickness of a temperature boundary layer formed in the vicinity of the surface of the pin-shaped fin 7 can be obtained. As a result, the thermal resistance to the first fluid 14 inside the partition wall 3 is decreased and convection heat transfer of the first fluid is promoted.

An inner surface 3B of the partition wall 3 is formed with a non-sealed anodized aluminum coating. The anodized aluminum coating is formed with a plurality of pores each having a pore diameter of 10 nm to 30 nm. As a result, in the heat exchanger 1, the fins 5 formed on the outer surface 3A of the partition wall 3 promote heat transfer between the second fluid and the partition wall 3, while the pores formed on the inner surface 3B of the partition wall 3 promote heat transfer between the first fluid and the partition wall 3. Meanwhile, the anodized aluminum coating may be omitted. Further, the anodized aluminum coating may be formed only on a part of the inner surface 3B of the partition wall 3 (for example, only on the inner surface 13B of the bottom portion 13).

The shell 9 is substantially tubular in shape and is configured to cover the outer sides of the plurality of fins 5, as shown in FIG. 1. As a result, an inner surface 9A of the shell 9 and the outer surface 3A of the partition wall 3 define a flow path for the second fluid 15, and the plurality of fins 5 are positioned in the flow path.

The shell 9 has an upper portion 51 connected to the outer edges of the plurality of fins 5 positioned opposite from the partition wall 3, and a lower portion 53 connected to the lower edge of the upper portion 51 and extending downward. A lower edge 51A of the upper portion 51 is connected to the corner of the projection 31 of the base portion 19 of each fin 5. The lower portion 53 has an opening 55 positioned outside (in this example, on the lower side of) the pin-shaped fins 7 and substantially circular in shape. The opening 55 forms an inlet for the second fluid 15. With this shell 9, it is possible to efficiently guide the second fluid to the fins 5 provided on the bottomed tubular body.

(Manufacture of Heat Exchanger)

Next, manufacturing of the heat exchanger 1 having the configuration described above will be described. The partition wall 3, the plurality of fins 5, and the plurality of pin-shaped fins 7 of the heat exchanger 1 are integrally molded by additive manufacturing with the powder material using the known 3D printing technology. The processing method used in the additive manufacturing is not particularly limited as long as the structure described above can be achieved. For example, the heat exchanger 1 is molded by simultaneously jetting the metal powder and irradiating laser (or electron beam) onto a target part to form layers of molten metal powder in the shape described above.

The shell 9 may be integrally molded with the partition wall 3. Alternatively, the shell 9 may be formed of a material different from the material forming the partition wall 3 and then attached by welding or the like so as to cover the outer sides of the plurality of fins 5.

The non-sealed anodized aluminum coating on the inner surface 3B of the partition wall 3 is formed by a known anodizing process (aluminum anodization process). The structure (pore diameter or the like) of the plurality of pores of the anodized aluminum coating may be checked using a field emission scanning electron microscope (FE-SEM), for example.

The plurality of plate-shaped members 35 are formed of a different material of higher emissivity than the material forming the partition wall 3 and the fins 5, press-fitted into the plurality of mounting grooves 37 formed in the outer surface 3A of the bottom portion 13 of the partition wall 3, and fixed to the outer surface of the bottom portion 13 of the partition wall 3.

As described above, it is possible to improve the heat exchange efficiency even when there is a limitation on the material used for integrally molding the partition wall 3 and the fins 5, by integrally molding the partition wall 3 and the plurality of fins 5 by additive manufacturing with the powder material, and forming the plate-shaped members 35 of a different material of higher emissivity than the material forming the partition wall 3 and the fins 5 and fixing to the outer surface of the bottom portion 13.

(Use of Heat Exchanger)

When using the heat exchanger 1, for example, a user pours water into the partition wall 3 as the first fluid and then starts a combustor (for example, a gas burner) disposed on the lower side of the heat exchanger 1. Accordingly, the combustion gas of the combustor serving as the second fluid is introduced through the opening 55 of the shell 9. The combustion gas flows among the plurality of fins 5 positioned between the partition wall 3 and the shell 9 and is discharged from an open upper portion of the shell 9. At this time, the heat of the combustion gas is transferred to the partition wall 3, the fins 5, and the pin-shaped fins 7 and further transferred to the first fluid via the inner surface 3B of the partition wall 3. Due to this heat exchange between the combustion gas and the water, it is possible to increase the temperature of the water inside the partition wall 3 (eventually, to boil the water).

As described above, in the heat exchanger 1, the partition wall 3 and the plurality of fins 5 are integrally molded so as to reduce the thermal resistance at the interface between each fin 5 and the partition wall 3, and the grooves of appropriate depths are formed on the plurality of fins 5 each having a curved part (in this example, the side portion 17) so as to increase the heat transfer area of the fins 5 while facilitating the flow of the second fluid in the vicinity of the surfaces of the fins 5. As a result, it is possible to improve the heat exchange efficiency of the heat exchanger 1.

Although the embodiment of the present disclosure has been described above with reference to the accompanying drawings, it goes without saying that the present disclosure is not limited to such an embodiment. It will be apparent that those skilled in the art, within the scope described in the claims, can come up with various kinds of modification examples, or modifications, which are naturally within the technical scope of the present disclosure. In addition, the components in the embodiment described above may be arbitrarily combined without departing from the spirit of the disclosure.

For example, the first fluid and the second fluid are not necessarily the combination of liquid and gas, and any combination of fluids (for example, a combination of liquids or a combination of gases) may be adopted. The heat exchanger 1 may use at least two fluids and may also use three or more fluids to conduct heat exchange therebetween.

The heat exchanger 1 may be used in a refrigerator, an industrial heat exchanger, a plate-shaped heat exchanger, pipe-shaped passage-type heat exchanger, for example. Further, the heat exchanger 1 may be used as a part of a device or a machine that has a partition wall and fins, it can function as a heat exchanger. The heat exchanger 1 may be used, for example, in a fluid passage structure of an air-cooled engine head, a radiator, an oil cooler, a water boiler, an air-conditioning facility, an exhaust gas recirculation (EGR) cooler, a stirling engine, or the like.

Further, in the embodiment described above, the base portions 19 of the fins 5 are arranged radially on the bottom portion 13, but embodiments are not limited thereto, and the base portions 19 of the fins 5 may be arranged in parallel. In addition. "parallel" is not strictly limited to being parallel, but may also include an arrangement in the substantially same direction. Thin plate-shaped members 35 with high emissivity or heat resistance may be arranged between the base portions 19 of the fins 5 arranged in parallel, and in this case, the heat transfer coefficient is also apparently improved as in the case of the radial fins, as the amount of heat transferred from the second fluid 15 to the fins 5 is increased by the radiant heat emitted from the plate-shaped members 35 which reach a high temperature.

At least the following characteristics have been described herein. While the corresponding components and the like in the embodiments described above are indicated in parenthesis, embodiments are not limited thereto.

(1) A heat exchanger (the heat exchanger 1) including a bottomed tubular container-shaped partition wall (the partition wall 3) that separates two fluids having different temperatures, in which the partition wall includes a side circumferential portion (the side circumferential portion 11) in a cylindrical shape, and a bottom portion (the bottom portion 13) configured to close an opening on one side of the side circumferential portion, and a plurality of fins (the fins 5) are formed on an outer surface of the partition wall, and arranged side by side in a circumferential direction around a center of a cylinder of the side circumferential portion, each of the fins includes a base portion (the base portion 19) connected to an outer surface of the bottom portion, the base portions of the plurality of fins all extend from the outer surface of the bottom portion in a radial direction around the center of the cylinder of the side circumferential portion, and are arranged side by side in the circumferential direction on the outer surface of the bottom portion, and plate-shaped members (the plate-shaped members 35) are provided between the base portions of the fins adjacent in the circumferential direction, and fixed to the outer surface of the bottom portion, the partition wall and the plurality of fins are integrally molded of a same material, and the plate-shaped members are formed of a different material of higher emissivity than the material of the fins.

According to (1), it is possible to improve the heat exchange efficiency even when there is a limitation to the material used for integrally molding the partition walls and the fins, because it is possible to enhance heat radiation (radiant heat transfer) by the plate-shaped members formed of a material of higher emissivity.

(2) The heat exchanger according to (1), in which the plate-shaped members are fixed to the outer surface of the bottom portion with a heat-resistant adhesive.

According to (2), since the plate-shaped members are fixed to the outer surface of the bottom portion with the heat-resistant adhesive, even when the material with a melting point significantly different from that of the material forming the fins is used as the material for the plate-shaped members, the plate-shaped members can be firmly fixed to the outer surface of the bottom portion.

(3) The heat exchanger according to (1) or (2), in which the plurality of fins include first and second fins (the first fins 5L and the second fins 5S), radially inner end portions of the base portions of the first fins are positioned further on the inside than the radially inner end portions of the base portions of the second fins in the radial direction, the first and second fins are alternately arranged in the circumferential direction, and the plate-shaped members as seen from the bottom extend between the first fins adjacent in the circumferential direction, are further on the inside than the radially inner end portions of the second fins in the radial direction, and extend in the radial direction along an imaginary straight line extending from the radially inner end portions of the second fins toward the center in the radial direction.

According to (3), it is possible to form the plate-shaped members formed of a material of higher emissivity close to the center of the bottom portion, thereby improving the heat exchange efficiency of the heat exchanger. Further, since the plate-shaped members are arranged so as to prevent an increase in loss that may occur when the fluid flows from the center radially outward between the fins adjacent in the circumferential direction, the heat exchange efficiency of the heat exchanger is further improved.

(4) The heat exchanger according to any one of (1) to (3), in which the plate-shaped members are not in contact with the fins.

According to (4), the radiant heat from the plate-shaped members can be transferred to the fins while maintaining heat conduction inside the fins.

(5) A method for manufacturing a heat exchanger including a bottomed tubular container-shaped partition wall (the partition wall 3) that separates two fluids having different temperatures, in which the partition wall (the partition wall 3) includes a side circumferential portion (the side circumferential portion 11) in a cylindrical shape, a bottom portion (the bottom portion 13) configured to close an opening on one side of the side circumferential portion, and a plurality of fins (fins 5) formed on the outer surface of the partition wall and arranged in a circumferential direction around a center of a cylinder of the side circumferential portion, each of the fins includes a base portion (the base portion 19) connected to an outer surface of the bottom portion, the base portions of the plurality of fins all extend from the outer surface of the bottom portion in a radial direction around the center of the cylinder of the side circumferential portion, and are arranged side by side in the circumferential direction on the outer surface of the bottom portion, and plate-shaped members (the plate-shaped members 35) are provided between the base portions of the fins adjacent in the circumferential direction, and fixed to the outer surface of the bottom portion, in which the method for manufacturing the heat exchanger (the heat exchanger 1) includes integrally molding the partition wall and the plurality of fins by additive manufacturing with powder; and forming the plate-shaped members provided between the fins adjacent in the circumferential direction with a different material of higher emissivity than the material of the fins, and fixing the plate-shaped members to an outer surface of the bottom portion.

According to (5), it is possible to improve the heat exchange efficiency even when there is a limitation to the material used for integrally molding the partition walls and the fins, because it is possible to enhance heat radiation (radiant heat transfer) by the plate-shaped members formed of a material of higher emissivity.

(6) A heat exchanger (the heat exchanger 1) including a bottomed tubular container-shaped partition wall (the partition wall 3) that separates two fluids having different temperatures, in which the partition wall includes a side circumferential portion in a cylindrical shape (the side circumferential portion 11), and a bottom portion (the bottom portion 13) configured to close an opening on one side of the side circumferential portion, and a plurality of fins (the fins 5) are formed on an outer surface of the partition wall, and arranged side by side in a circumferential direction around a center of a cylinder of the side circumferential portion, each of the fins includes a base portion (the base portion 19) connected to an outer surface of the bottom portion, the base portions of the plurality of fins are formed side by side in parallel, plate-shaped members (the plate-shaped members 35) are provided between the base portions of the adjacent fins, and fixed to the outer surface of the bottom portion, the partition wall and the plurality of fins are integrally molded of a same material, and the plate-shaped members are formed of a different material of higher emissivity or heat resistance than the material of the fins.

According to the (6), it is possible to enhance the heat exchange efficiency even when there is a limitation to the material used for integrally molding the partition wall and the fins, because it is possible to enhance heat radiation (radiant heat transfer) by the plate-shaped members formed of a material of higher emissivity.

The invention claimed is:
1. A heat exchanger comprising
a partition wall that has a bottomed tubular container shape and separates two fluids having different temperatures, wherein:
the partition wall includes a side circumferential portion in a cylindrical shape, and a bottom portion configured to close an opening on one side of the side circumferential portion;
a plurality of fins are formed on an outer surface of the partition wall, and arranged side by side in a circumferential direction around a center of a cylinder of the side circumferential portion;
each of the fins includes a base portion connected to an outer surface of the bottom portion;
the base portions of the plurality of fins all extend from the outer surface of the bottom portion in a radial direction around the center of the cylinder of the side circumferential portion, and are arranged side by side in the circumferential direction on the outer surface of the bottom portion;
plate-shaped members are provided between the base portions of the fins adjacent in the circumferential direction, and fixed to the outer surface of the bottom portion;
the partition wall and the plurality of fins are integrally molded of a same material; and
the plate-shaped members are formed of a different material of higher emissivity or heat resistance than the material of the fins.

2. The heat exchanger according to claim 1, wherein the plate-shaped members are press-fitted into grooves provided on the outer surface of the bottom portion, or fixed to the outer surface of the bottom portion with a heat-resistant adhesive, or welded to the outer surface of the bottom portion.

3. The heat exchanger according to claim 1, wherein:
the plurality of fins include first and second fins;
radially inner end portions of the base portions of the first fins are positioned further on the inside than radially inner end portions of the base portions of the second fins in the radial direction;
the first and second fins are alternately arranged in the circumferential direction; and
the plate-shaped members as seen from the bottom extend between the first fins adjacent in the circumferential direction, are further on the inside than the radially inner end portions of the second fins in the radial direction, and extend in the radial direction along an imaginary straight line extending from the radially inner end portions of the second fins toward the center in the radial direction.

4. The heat exchanger according to claim 1, wherein the plate-shaped members are not in contact with the fins.

5. A method for manufacturing a heat exchanger including a partition wall that has a bottomed tubular container shape and separates two fluids having different temperatures, wherein:
the partition wall includes a side circumferential portion in a cylindrical shape, and a bottom portion configured to close an opening on one side of the side circumferential portion;
a plurality of fins are formed on the outer surface of the partition wall and arranged in a circumferential direction around a center of a cylinder of the side circumferential portion;
each of the fins includes a base portion connected to an outer surface of the bottom portion;
the base portions of the plurality of fins all extend from the outer surface of the bottom portion in a radial direction around the center of the cylinder of the side circumferential portion, and are arranged side by side in the circumferential direction on the outer surface of the bottom portion;
plate-shaped members are provided between the base portions of the fins adjacent in the circumferential direction, and fixed to the outer surface of the bottom portion; and
the method comprises:
integrally molding the partition wall and the plurality of fins by additive manufacturing with powder; and
forming the plate-shaped members provided between the fins adjacent in the circumferential direction with a different material of higher emissivity or heat resistance than the material of the fins and fixing the plate-shaped members to an outer surface of the bottom portion.

6. A heat exchanger comprising
a partition wall that has a bottomed tubular container shape and separates two fluids having different temperatures, wherein:
the partition wall includes a side circumferential portion in a cylindrical shape, and a bottom portion configured to close an opening on one side of the side circumferential portion;
a plurality of fins are formed on an outer surface of the partition wall, and arranged side by side in a circumferential direction around a center of a cylinder of the side circumferential portion;
each of the fins includes a base portion connected to an outer surface of the bottom portion;
the base portions of the plurality of fins are formed side by side in parallel;
plate-shaped members are provided between the base portions of the adjacent fins, and fixed to the outer surface of the bottom portion;
the partition wall and the plurality of fins are integrally molded of a same material; and
the plate-shaped members are formed of a different material of higher emissivity or heat resistance than the material of the fins.

* * * * *